D. A. STEVENS.
HOSE-CLAMP.

No. 172,669. Patented Jan. 25, 1876.

WITNESSES
Wm. A. Skinkle
Baltis De Long

INVENTOR
David A. Stevens

By his Attorney
Wm. D. Baldwin

UNITED STATES PATENT OFFICE.

DAVID A. STEVENS, OF TOLEDO, OHIO.

IMPROVEMENT IN HOSE-CLAMPS.

Specification forming part of Letters Patent No. 172,669, dated January 25, 1876; application filed December 21, 1875.

*To all whom it may concern:*

Be it known that I, DAVID A. STEVENS, of Toledo, in the county of Lucas and State of Ohio, have invented certain new and useful Improvements in Hose-Clamps, of which the following is a specification, reference being had to the accompanying drawings, in which—

Figure 1:
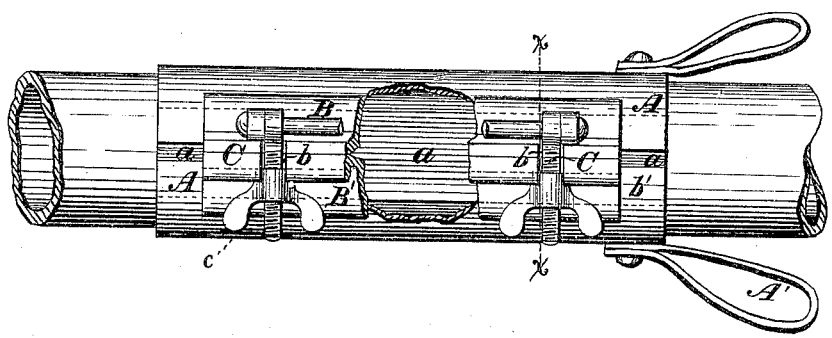
Figure 2:
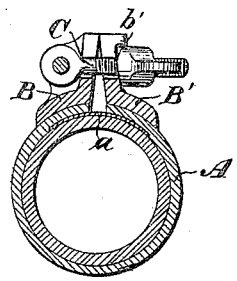

Figure 1 is a plan view, and Fig. 2 a transverse section on the line $x\ x$ of Fig. 1.

My invention relates to that class of hose-clamps adapted to cover ruptures in hose to prevent leakage; its objects are to provide a cheap, simple, and effective clamp, and one easily applied.

The subject-matter claimed will hereinafter be specified.

The body A of the clamp is composed of leather, rubber, sheet metal, or other flexible material, to each edge of which is secured a flange, B B', the flange B having eyebolts C pivoted thereto, and provided with thumb-nuts $c$. The flanges B B' are slotted at $b$ to receive the eyebolts C, and the flange B' is provided with an overhanging lip, $b'$, under which the thumb-nuts catch to hold the bolts securely in position. A flap, $a$, preferably of sheet metal, attached to one edge of the body or cover of the clamp, overlaps the line of junction of the flange, and thus secures a tight joint. The clamp can readily be handled by means of loops A' attached thereto.

The clamp is applied to the hose by releasing the clamp-screws or eyebolts, passing it around the hose over the ruptured part, pressing the flanges together, swinging the eyebolts over into the slots of the flanges, and then tightening up the nuts; or the clamp may be applied loosely to the sound part of the hose, and then be drawn endwise over the ruptured part and screwed up.

I claim as my invention—

1. The combination of the slotted flange B', its overhanging lip, and the thumb-nuts of the clamping-bolts, for the purposes set forth.

2. The improved hose-clamp hereinbefore described, consisting of the combination of the flexible body, the slotted flanges thereon, the clamping bolts and nuts, the flap overlapping the line of junction of the flanges, and the overhanging lip on the flange opposite to that which carries the bolts, these members being constructed and operating substantially as set forth.

In testimony whereof I have hereunto subscribed my name.

DAVID A. STEVENS.

Witnesses:
N. H. SWAYNE, Jr.,
FRANK B. SWAYNE.